(12) United States Patent
Fujito et al.

(10) Patent No.: US 11,243,193 B2
(45) Date of Patent: Feb. 8, 2022

(54) SUPERCRITICAL FLUID DEVICE

(71) Applicant: SHIMADZU CORPORATION, Kyoto (JP)

(72) Inventors: Yuka Fujito, Kyoto (JP); Tairo Ogura, Kyoto (JP); Kenichiro Tanaka, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 187 days.

(21) Appl. No.: 16/485,006

(22) PCT Filed: Mar. 17, 2017

(86) PCT No.: PCT/JP2017/010937
§ 371 (c)(1),
(2) Date: Aug. 9, 2019

(87) PCT Pub. No.: WO2018/146826
PCT Pub. Date: Aug. 16, 2018

(65) Prior Publication Data
US 2020/0025725 A1     Jan. 23, 2020

Related U.S. Application Data

(60) Provisional application No. 62/458,107, filed on Feb. 13, 2017.

(51) Int. Cl.
*G01N 30/36*      (2006.01)
*G01N 30/22*      (2006.01)

(52) U.S. Cl.
CPC ............ *G01N 30/36* (2013.01); *G01N 30/22* (2013.01)

(58) Field of Classification Search
CPC ........ G01N 30/36; G01N 30/22; G01N 30/32; G01N 2030/328

(Continued)

(56) References Cited

U.S. PATENT DOCUMENTS

2015/0276689 A1* 10/2015 Watanabe .............. G01N 30/32
                                                                422/89
2017/0276652 A1     9/2017 Funada

FOREIGN PATENT DOCUMENTS

| JP | 2010-101875 A | 5/2010 |
| WO | 2015/183290 A1 | 12/2015 |
| WO | 2016/031008 A1 | 3/2016 |

OTHER PUBLICATIONS

Communication dated Mar. 1, 2021, issued by the State Intellectual Property Office of the P.R.C. in application No. 201780086418.0.

(Continued)

*Primary Examiner* — Robert R Raevis
(74) *Attorney, Agent, or Firm* — Sughrue Mion, PLLC

(57) ABSTRACT

A supercritical fluid device includes an analytical channel, a liquid delivery part for delivering a mobile phase constituting a supercritical fluid in the analytical channel, a back pressure regulator for controlling a pressure of the analytical channel so as to cause the mobile phase in the analytical channel to reach a supercritical state, a sample injecting device that includes a sample holder for holding a sample and a switching valve for switching between a state where the sample holder is arranged on the analytical channel and a state where the sample holder is not arranged on the analytical channel, a bypass channel whose one end is connected to a position upstream of the sample injecting device and whose other end is connected to a position downstream of the sample injecting device on the analytical channel, and an analytical column for separating a sample introduced by the sample injecting device into individual components, the analytical column is provided downstream of the position to which the other end of the bypass channel is connected on the analytical channel.

1 Claim, 4 Drawing Sheets

(58) Field of Classification Search
USPC ..... 73/61.55, 61.56, 863.72, 863.73, 864.83, 73/864.84; 422/63, 70
See application file for complete search history.

(56) References Cited

OTHER PUBLICATIONS

Communication dated Jun. 30, 2020, from the Japanese Patent Office in application No. 2018-566739.
International Search Report for PCT/JP2017/010937 dated Jun. 13, 2017 [PCT/ISA/210].
Written Opinion for PCT/JP2017/010937 dated Jun. 13, 2017 [PCT/ISA/237].

* cited by examiner

SUPERCRITICAL FLUID DEVICE

CROSS REFERENCE TO RELATED APPLICATIONS

This application is a National Stage of International Application No. PCT/JP2017/010937, filed on Mar. 17, 2017, which claims priority from U.S. Patent Application No. 62/458,107, filed on Feb. 13, 2017.

TECHNICAL FIELD

The present invention relates to a supercritical fluid device such as a supercritical fluid chromatograph (SFC) and an online supercritical fluid extraction (SFE)-SFC system.

BACKGROUND ART

As a device using a supercritical fluid, a supercritical fluid chromatograph (hereinafter, SFC) that charges a sample in an analytical channel in which a supercritical fluid flows and separates the sample in an analytical column for analysis, and a supercritical fluid extraction (hereinafter, SFE) that introduces a supercritical fluid in an extraction container storing a sample to extract a component, have been known.

In addition, an SFE-SFC system in which SFC is integrated with SFE has been proposed and carried out (see Patent Document 1). In the SFE-SFC system, a sample component extracted in SFE is introduced online in an analytical column of SFC to separate and analyze the sample component.

PRIOR ART DOCUMENT

Patent Document

Patent Document 1: WO 2016/031008

SUMMARY OF THE INVENTION

Problems to be Solved by the Invention

The SFC and SFE-SFC system described above include a sample injecting device that introduces a sample in an analytical channel in which a supercritical fluid flows. The sample injecting device is generally configured to include a sample holder that temporarily holds a sample charged such as a sample loop and switch between a state where the sample holder is interposed in the analytical channel and a state where the sample holder is not interposed in the analytical channel by a switching valve such as a 6-way valve. As the sample holder holding the sample is interposed in the analytical channel, the sample is introduced in the analytical channel.

In the SFC and SFE-SFC system, the pressure of the analytical channel is controlled to be constant by a back pressure regulator (BPR) disposed downstream of the analytical column. However, at the time of switching the switching valve in the sample injecting device, in particular, at the time of switching the switching valve when introducing the sample in the analytical channel, the pressure of the analytical channel may vary, resulting in a temporal decrease in the stability of the flow rate of a mobile phase.

An object of the present invention is to reduce the influence of a pressure variation at the time of switching a switching valve in a sample injecting device.

Solutions to the Problems

A supercritical fluid device according to the present invention includes an analytical channel, a liquid delivery part for delivering a mobile phase constituting a supercritical fluid in the analytical channel, a back pressure regulator for controlling a pressure of the analytical channel so as to cause the mobile phase in the analytical channel to reach a supercritical state, a sample injecting device that includes a sample holder for holding a sample and a switching valve for switching between a state where the sample holder is arranged on the analytical channel and a state where the sample holder is not arranged on the analytical channel, a bypass channel whose one end is connected to a position upstream of the sample injecting device and whose other end is connected to a position downstream of the sample injecting device on the analytical channel, and an analytical column for separating a sample introduced by the sample injecting device into individual components. The analytical column is provided downstream of the position to which the other end of the bypass channel is connected on the analytical channel.

The present invention is applicable to an SFE-SFC system. That is, in the supercritical fluid device according to the present invention, a supercritical fluid extraction part for extracting components from a sample by a mobile phase from the liquid delivery part may be provided upstream of a position to which one end of the bypass channel is connected on the analytical channel.

In the SFE-SFC system, after a sample component is extracted in SFE, the sample injecting device introduces a reference sample in an analytical channel for analysis. In this case, as the switching valve of the sample injecting device is switched at the time of introducing the reference sample in the analytical channel, the pressure of the analytical channel may vary, which affects the analysis result.

According to the present invention, the bypass channel is provided so that a part of the mobile phase from the liquid delivery part is led to the analytical column without passing the sample injecting device. The pressure variation of the analytical channel due to switching of the switching valve in the sample injecting device at the time of introducing the reference sample in the analytical channel is thus reduced and the analysis result is less affected accordingly.

As described in [0027] of Patent Document 1, in SFE, the speed of extraction is prioritized, and thus, the flow rate of a supercritical fluid (mobile phase) is desirably increased. On the other hand, in SFC, separation in an analytical column is prioritized, and thus, the flow rate in the analytical column is desirably decreased. Consequently, with respect to the flow rate, there is a trade-off between SFE and SFC. If SFE and SFC are simply made online, the extraction speed of SFE or the separation in SFC needs to be sacrificed.

In order to solve such a problem, as disclosed in Patent Document 1, it has been proposed and performed to branch the analytical channel at a position upstream of the analytical column in the SFE-SFC system for the purpose of splitting the mobile phase having passed SFE. As the mobile phase is split upstream of the analytical column, the flow rate of the mobile phase flowing into the analytical column is decreased. Consequently, high extraction speed of SFE and high separation performance of SFC can be achieved.

Preferably, the supercritical fluid device according to the present invention further includes a split channel that branches from the analytical channel at a position downstream of a position to which the other end of the bypass channel is connected on the analytical channel and upstream of the analytical column. Consequently, high extraction speed of the supercritical fluid part and high separation performance of the analytical column can be achieved.

In the case where the split channel that splits the mobile phase at a position upstream of the analytical column is provided, to improve the reproducibility of the analysis result, the rate of the flow rate of the mobile phase flowing to the side of the analytical column and the flow rate of the mobile phase flowing to the side of the split channel, that is, the split ratio needs to be stabilized. The split ratio is largely affected by the pressure variation of the analytical channel. However, according to the present invention, the bypass channel that reduces a pressure variation due to switching of the switching valve in the sample injecting device is provided. Consequently, a variation in the split ratio is reduced and a decrease in the reproducibility of the analysis result is prevented accordingly.

When the reference sample introduced by the sample injecting device passes a branch portion of the analytical channel to the split channel, the split ratio may vary due to a difference in the viscosity of a fluid and the flow rate of the mobile phase may vary accordingly. In the present invention, however, the other end of the bypass channel is connected to a position upstream of the branch portion of the analytical channel to the split channel. Consequently, the reference sample is diluted with the mobile phase from the bypass channel, and thus, more distributing in the analytical channel. It is thus possible to reduce a variation in the split ratio when the reference sample introduced by the sample injecting device passes the branch portion of the analytical channel to the split channel and a variation in the flow rate of the mobile phase.

Effects of the Invention

The supercritical fluid device according to the present invention includes a bypass channel whose one end is connected to a position upstream of the sample injecting device and whose other end is connected to a position downstream of the sample injecting device on the analytical channel. Consequently, the pressure variation of the analytical channel due to switching of the switching valve in the sample injecting device is reduced, the flow rate of the mobile phase flowing in the analytical channel is stabilized, and the reproducibility of the analysis result is improved accordingly.

EMBODIMENT OF THE INVENTION

An embodiment of a supercritical fluid device according to the present invention will be described below with reference to the drawings.

Figure 1:
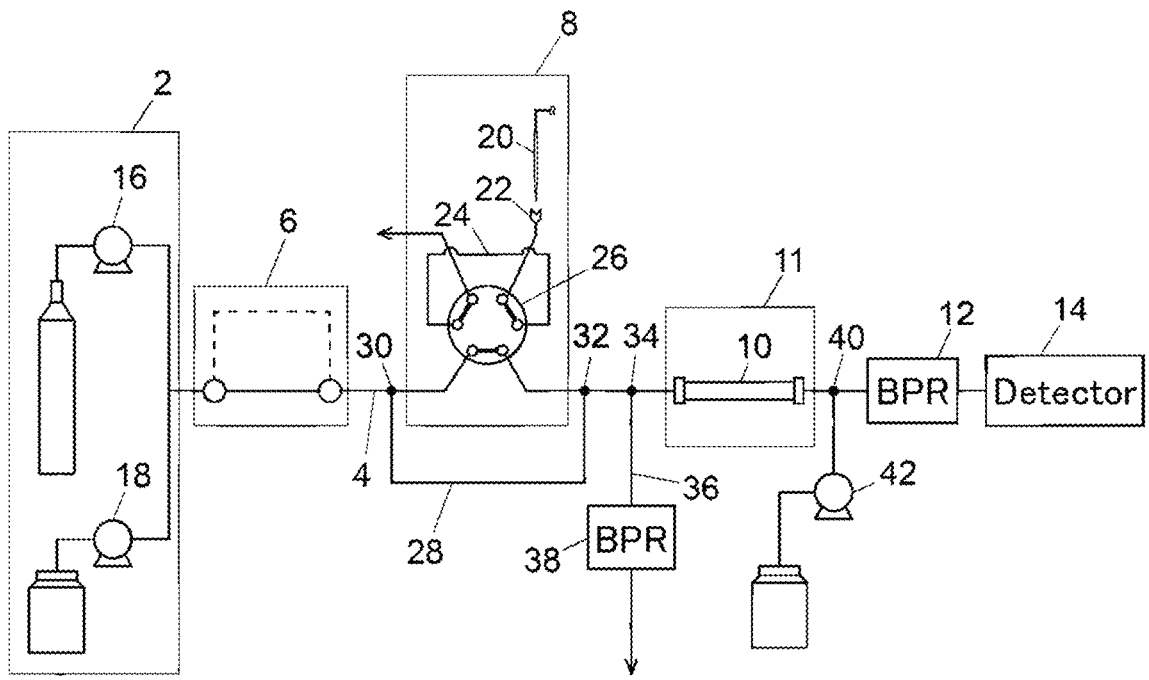
FIG. 1 is a schematic configuration view of a supercritical fluid device according to an embodiment.

A configuration of the supercritical fluid device according to the embodiment will be described first with reference to FIG. 1. The supercritical fluid device according to the embodiment is an SFE-SFC system in which a supercritical fluid extraction (SFE) that extracts a sample component by a supercritical fluid is integrated with a supercritical fluid chromatograph (SFC) that separates a sample into components in an analytical column by a supercritical fluid for analysis.

The supercritical fluid device according to the embodiment includes mainly a liquid delivery part 2 for delivering a mobile phase in an analytical channel 4, a supercritical fluid extraction part 6, a sample injecting device 8, an analytical column 10, a back pressure regulator (BPR) 12, and a detector 14.

The liquid delivery part 2 includes a liquid delivery pump 16 for delivering liquefied carbon dioxide and a liquid delivery pump 18 for delivering a modifier such as methanol. The liquid delivery part 2 delivers the carbon dioxide and the modifier as a mobile phase at a predetermined rate or while changing the rate. As the pressure of the analytical channel 4 is controlled to a predetermined pressure by the BPR 12, the carbon dioxide in the mobile phase delivered by the liquid delivery part 2 reaches a supercritical state and flows in the analytical channel 4 as a supercritical fluid.

The supercritical fluid extraction part 6 is disposed downstream of the liquid delivery part 2 on the analytical channel 4. Although not illustrated in FIG. 1, the supercritical fluid extraction part 6 introduces the mobile phase from the liquid delivery part 2 into an extraction container 44 (see FIG. 2) storing a sample and extracts an analysis target component. While the configuration of the supercritical fluid extraction part 6 is schematically illustrated in FIG. 1, the configuration, for example, may be similar to that of the SFE unit disclosed in Patent Document 1. The sample component extracted from the extraction container 44 is introduced in the analytical column 10 and separated.

The sample injecting device 8 is disposed downstream of the supercritical fluid extraction part 6 on the analytical channel 4. The sample injecting device 8 includes a needle 20 that sucks and ejects a sample, a charging port 22 into which the needle 20 is inserted for charging the sample, a sample loop 24 (sample holder) that temporarily holds the sample charged via the charging port 22, and a switching valve 26 for switching between a state where the sample loop 24 is arranged as a part of the analytical channel 4 and a state where the sample loop 24 is separated from the analytical channel 4.

An end of a bypass channel 28 is connected to a position 30 between the supercritical fluid extraction part 6 and the sample injecting device 8 on the analytical channel 4. The other end of the bypass channel 28 is connected to a position 32 on the analytical channel 4, which is downstream of the sample injecting device 8. The bypass channel 28 causes a part of the mobile phase from the liquid delivery part 2 having passed through the supercritical fluid extraction part 6 to flow into the downstream side of the sample injecting device 8 without passing through the sample injecting device 8. The channel resistance of the bypass channel 28 is preferably designed so that the rate of the flow rate of the mobile phase flowing to the side of the sample injecting device 8 and the flow rate of the mobile phase flowing in the bypass channel 28, that is, the split ratio at the position 30 on the analytical channel 4 is 1:3 to 1:10.

The analytical column 10 is disposed downstream of the sample injecting device 8 on the analytical channel 4, whereas the BPR 12 is disposed further downstream of the analytical column 10. The detector 14 is disposed further downstream of the BPR 12. The analytical column 10 is housed in a column oven 11 and kept at a constant temperature. A makeup channel for delivering a makeup liquid by a makeup pump 42 is connected to a position 40 between the analytical column 10 and the BPR 12 on the analytical channel 4.

The analytical channel 4 branches into a channel on the side of the analytical column 10 and a split channel 36 at a position 34 downstream of the position 32 to which the other end of the bypass channel 28 is connected and upstream of the analytical column 10. A BPR 38 that adjusts the split ratio at the branch portion 34 is disposed on the split channel 36 branched from the analytical channel 4. The BPR 38 adjusts the rate (split ratio) of the flow rate of the mobile phase flowing to the side of the analytical column 10 and the flow rate of the mobile phase flowing to the side of the split channel 36 to, for example, 1:99.

An example of an operation of the supercritical fluid device according to the embodiment will be described with reference to FIGS. 2 to 7.

Figure 2:
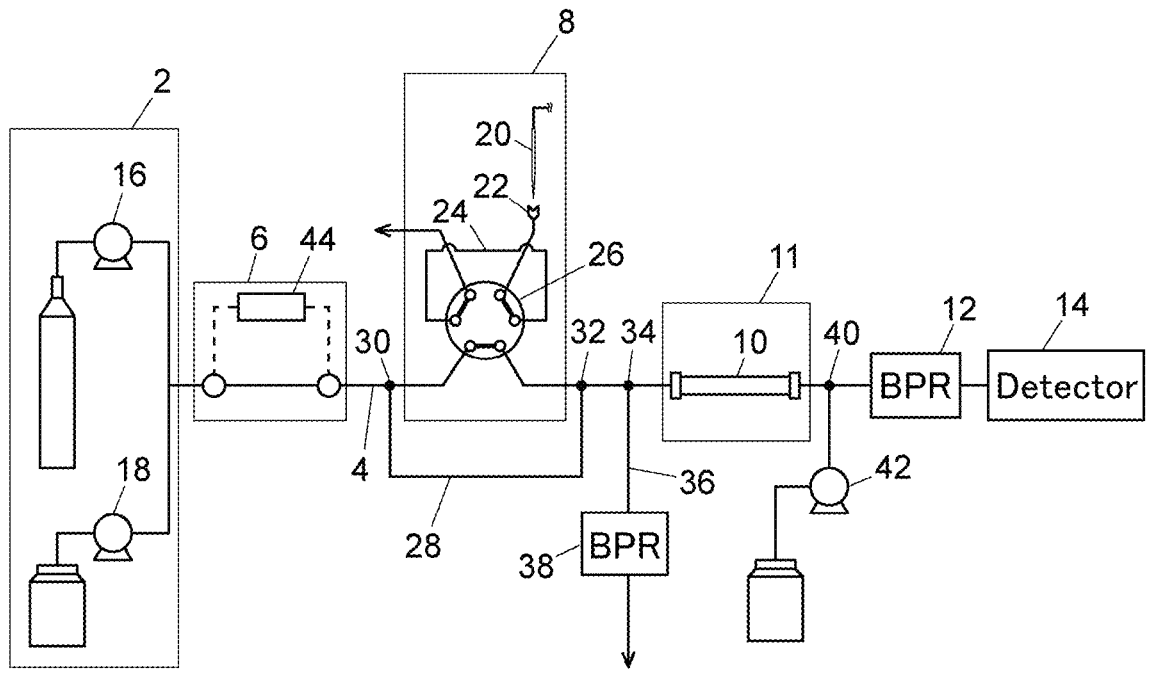
FIG. 2 is a schematic configuration view illustrating a state in preparing extraction in the embodiment.
Figure 3:
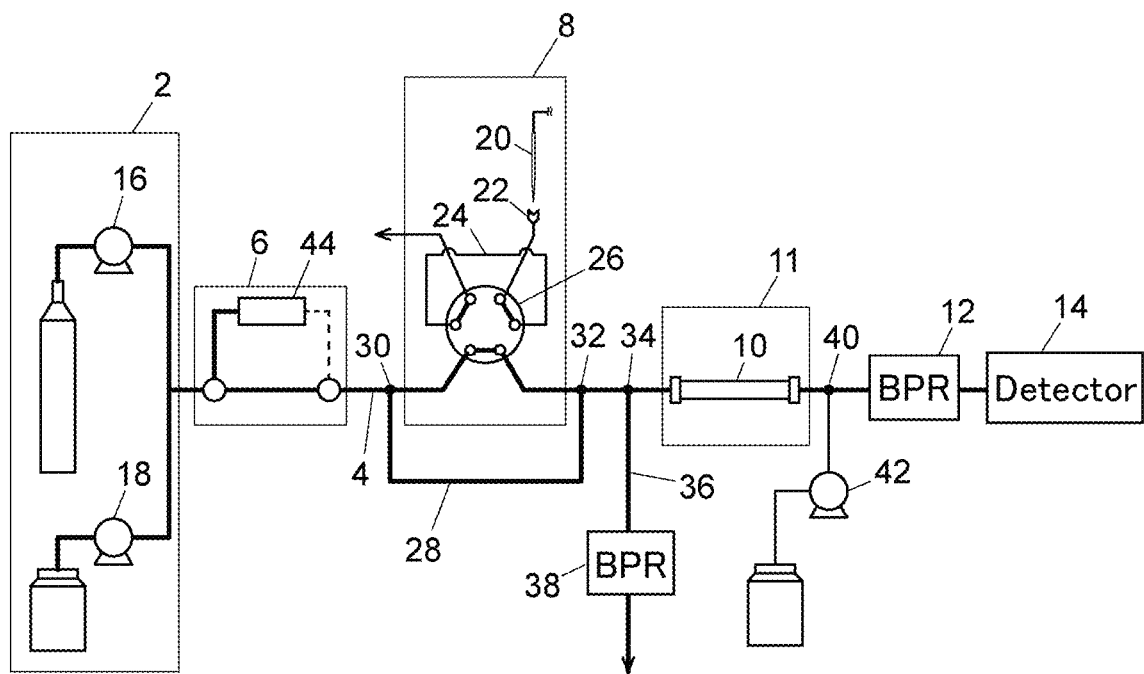
FIG. 3 is a schematic configuration view illustrating a state in static extraction in the embodiment.

As illustrated in FIG. 2, to extract a sample in the supercritical fluid extraction part 6, the extraction container 44 storing the sample is disposed in the supercritical fluid extraction part 6 and is heated to a predetermined temperature. As illustrated in FIG. 3, the entrance of the extraction container 44 is connected to the liquid delivery part 2 but the exit of the extraction container 44 is not connected to the analytical channel 4. Under such a state, a mobile phase (supercritical fluid) is delivered from the liquid delivery part 2 to be filled in the extraction container 44. In this way, static extraction of a sample component is performed.

Figure 4:
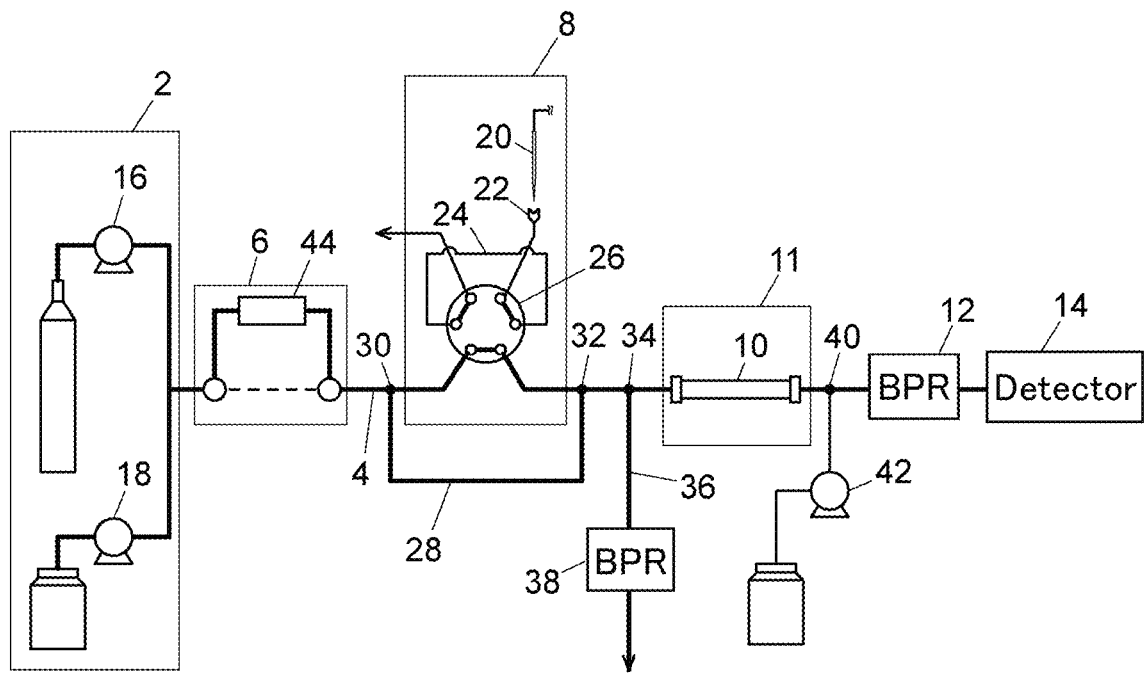
FIG. 4 is a schematic configuration view illustrating a state in dynamic extraction in the embodiment.

After the static extraction of the sample component, as illustrated in FIG. 4, the exit of the extraction container 44 is connected to the analytical channel 4 to perform dynamic extraction of the sample component. In this case, the switching valve 26 in the sample injecting device 8 separates the sample loop 24 from the analytical channel 4. In the dynamic extraction of the sample component, the sample component extracted from the extraction container 44 flows into the analytical channel 4 and the bypass channel 28 by the mobile phase from the liquid delivery part 2, and thus, reaching the branch portion 34. At the branch portion 34, the mobile phase containing the sample component is split at a predetermined rate, so that a part of the mobile phase is introduced in the analytical column 10, and the remaining is discarded through the split channel 36. The sample component introduced in the analytical column 10 is further separated into components, then introduced in the detector 14 via the BPR 12, and detected.

Figure 5:
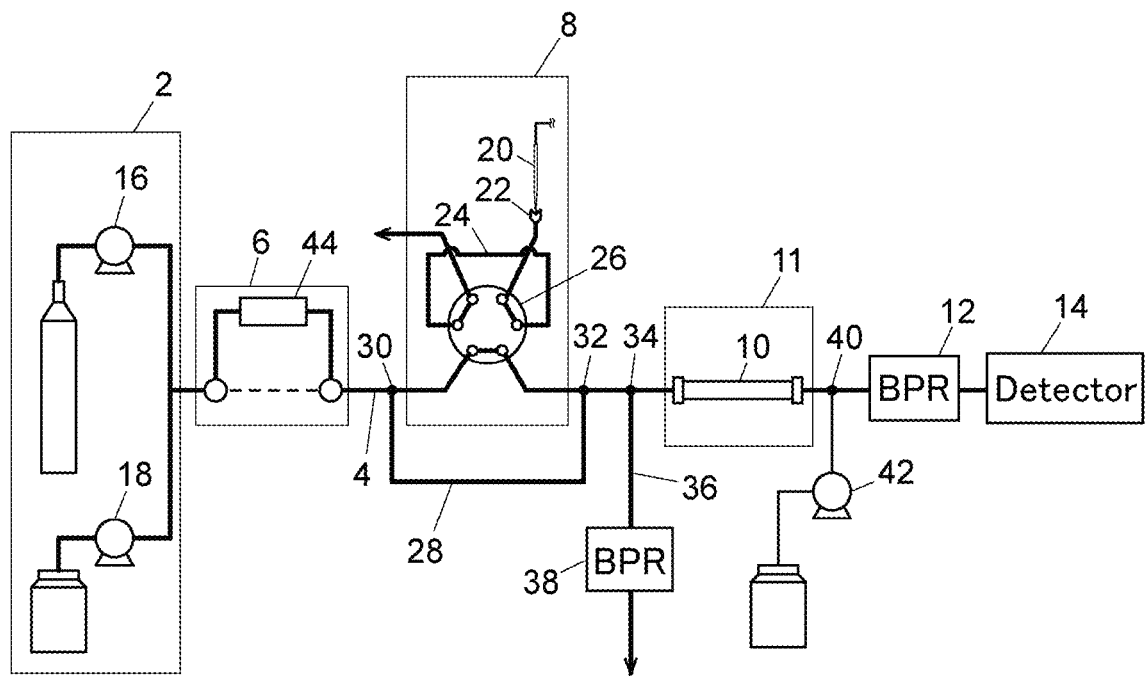
FIG. 5 is a schematic configuration view illustrating a state in preparing to charge a reference sample in the embodiment.

During the dynamic extraction described above, a reference sample is introduced in the analytical channel 4. The reference sample is stored in a vial (not illustrated) and sucked from the vial by the needle 20. As illustrated in FIG. 5, the reference sample is charged from the needle 20 via the charging port 22 into the sample loop 24. The reference sample charged via the charging port 22 stays in the sample loop 24.

Figure 6:
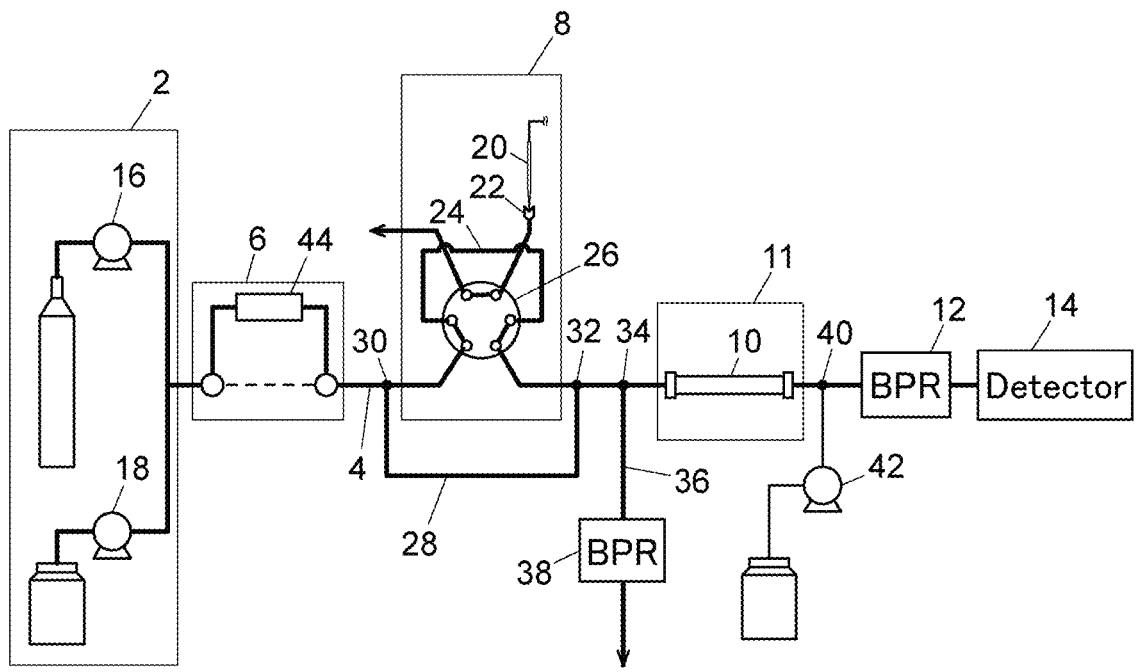
FIG. 6 is a schematic configuration view illustrating a state in charging the reference sample in the embodiment.

After the reference sample is charged into the sample loop 24, as illustrated in FIG. 6, the switching valve 26 is switched to a state where the sample loop 24 is introduced as a part of the analytical channel 4.

In this case, there is a pressure difference between the sample loop 24 before being introduced in the analytical channel 4 and the analytical channel 4. Consequently, as the switching valve 26 is switched, the pressure of the analytical channel 4 varies. When the pressure of the analytical channel 4 varies, the BPR 12 operates to keep the pressure of the analytical channel 4 at a predetermined pressure. Consequently, the split ratio at the branch portion 34 varies, and thus, the flow rate of the mobile phase flowing to the side of the analytical column 10 varies accordingly.

However, a part of the mobile phase from the liquid delivery part 2 flows in the bypass channel 28 without passing through the sample injecting device 8. The pressure variation at the time of switching the switching valve 26 is thus less than that in a case where the bypass channel 28 is not provided. Consequently, a range of variation in the split ratio at the branch portion 34 of the analytical channel 4 is reduced. The variation in the flow rate of the mobile phase flowing to the side of the analytical column 10 is also reduced. The reproducibility of the peak area of a chromatogram obtained in the detector 14 thus improves.

As the bypass channel 28 is provided, a part of the mobile phase from the liquid delivery part 2 flows in the bypass channel 28 to merge with the mobile phase containing the reference sample introduced by the sample injecting device 8 at the position 32 downstream of the sample injecting device 8. The reference sample introduced by the sample injecting device 8 is diluted with the mobile phase from the bypass channel 28 merging at the position 32, and thus, distributing more in the analytical channel 4. The mobile phase containing the reference sample diluted at the position 32 thus passes through the branch portion 34.

When the concentration of the reference sample in the mobile phase is high, the split ratio at the branch portion 34 may change due to a change in the viscosity of the liquid passing through the branch portion 34. In this embodiment, however, the reference sample is diluted with the mobile phase from the bypass channel 28 at the position 32 upstream of the branch portion 34, and thus, a variation in split ratio at the branch portion 34 is reduced.

Figure 7:
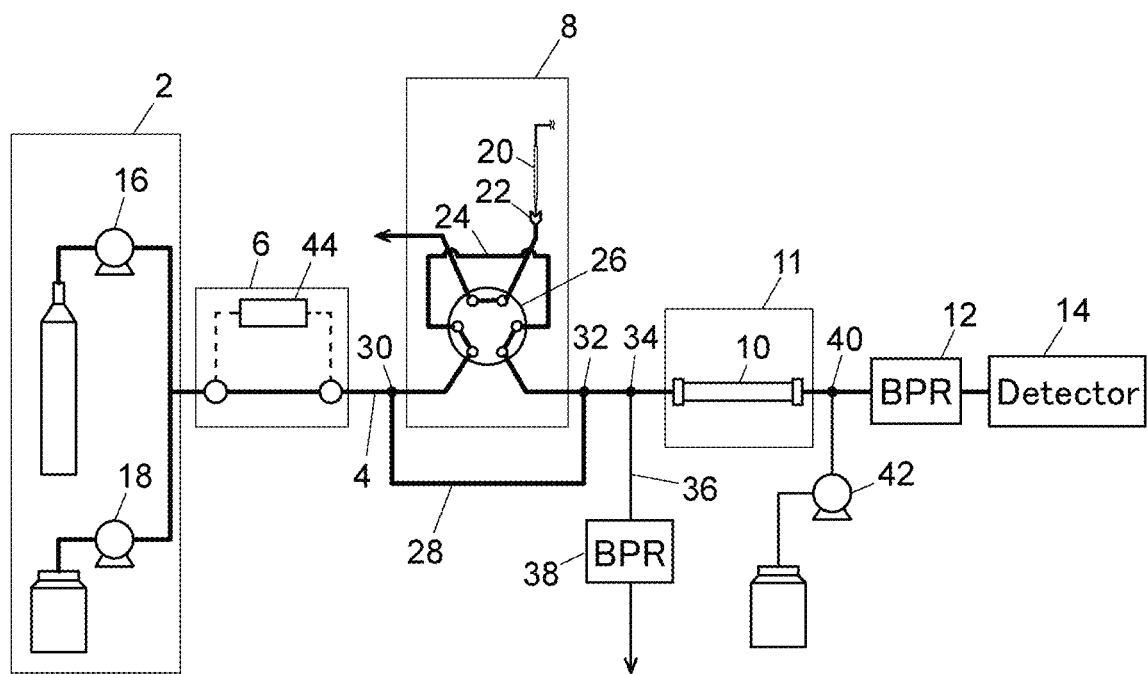
FIG. 7 is a schematic configuration view illustrating a state in analysis in the embodiment.

With the dynamic extraction of the sample component and the introduction of the reference sample illustrated in FIGS. 4 to 6, the sample component and the reference sample are introduced in the analytical column 10. As illustrated in FIG. 7, the extraction container 44 is then separated from the analytical channel 4, and the extraction of the sample component is completed. The sample component is then separated in the analytical column 10, and detection is performed by the detector 14. To increase the speed of elution from the analytical column 10, the BPR 38 is closed to reduce the flow rate of the split channel 36 to zero and increase the flow rate of the mobile phase flowing in the analytical column 10.

The present inventors examined the reproducibility of the peak area of the chromatogram of a detection signal from the detector 14 in a case where the bypass channel 28 was provided and in a case where the bypass channel 28 was not provided. As a result of the examination, the reproducibility of the peak area (% RSD of peak area) in the case where the bypass channel 28 was not provided was 8.8 to 17.6, whereas the reproducibility of the peak area in the case where the bypass channel 28 was provided was 2.6 to 3.8. That is, the examination shows that the reproducibility of the peak area improves 2.5 to 6.5 times by providing the bypass channel 28. In the examination, the rate of the flow rate of the mobile phase flowing to the side of the sample injecting device 8 and the flow rate of the mobile phase flowing to the side of the bypass channel 28, that is, the split ratio at the position 30 on the analytical channel 4 is designed to be 1:3 to 1:10.

DESCRIPTION OF REFERENCE SIGNS

2: Liquid delivery part
4: Analytical channel

6: Supercritical fluid extraction part
8: Sample injecting device
10: Analytical column
11: Column oven
12, 38: Back pressure regulator (BPR)
14: Detector
16, 18: Liquid delivery pump
20: Needle
22: Charging port
24: Sample loop (Sample holder)
26: Switching valve
28: Bypass channel
34: Branch portion
36: Split channel
42: Makeup pump
44: Extraction container

The invention claimed is:

1. A supercritical fluid device comprising:
an analytical channel;
a liquid delivery part for delivering a mobile phase constituting a supercritical fluid in the analytical channel;
a back pressure regulator for controlling a pressure of the analytical channel so as to cause the mobile phase in the analytical channel to reach a supercritical state;
a sample injecting device for injecting a reference sample into the analytical channel, the sample injecting device including a sample holder for holding the reference sample and a switching valve for switching between a state where the sample holder is arranged on the analytical channel and a state where the sample holder is not arranged on the analytical channel;
a bypass channel whose one end is connected to a position upstream of the sample injecting device and whose other end is connected to a position downstream of the sample injecting device on the analytical channel;
a supercritical fluid extraction part for extracting components from a sample by the mobile phase from the liquid delivery part, the supercritical fluid extraction part being provided upstream of a position to which one end of the bypass channel is connected on the analytical channel;
an analytical column for separating the components extracted from the sample by the supercritical fluid extraction part, the analytical column being provided downstream of the position to which the other end of the bypass channel is connected on the analytical channel; and
a split channel that branches from the analytical channel at a position downstream of a position to which the other end of the bypass channel is connected on the analytical channel and upstream of the analytical column.

* * * * *